J. N. STOUT AND E. E. PARSONAGE.
SECTIONAL PNEUMATIC TIRE.
APPLICATION FILED DEC. 13, 1920.
1,407,178.
Patented Feb. 21, 1922.
2 SHEETS—SHEET 1.
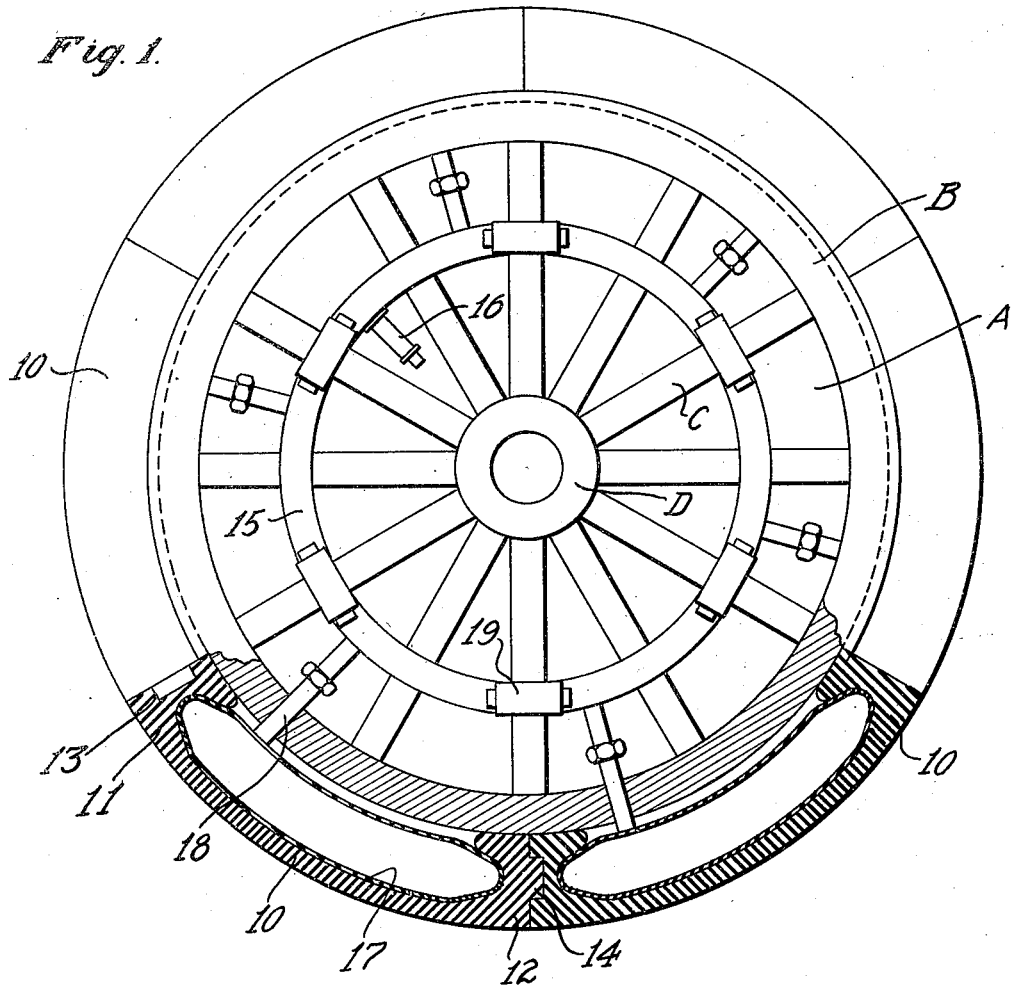
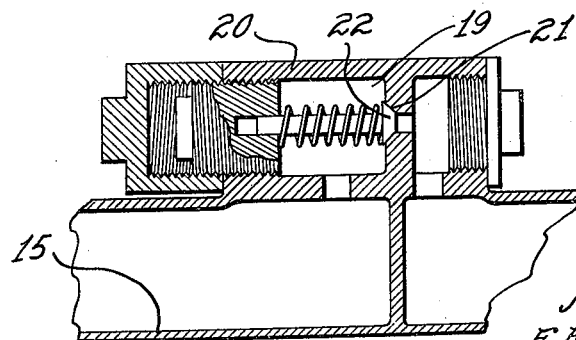

J. N. STOUT AND E. E. PARSONAGE.
SECTIONAL PNEUMATIC TIRE.
APPLICATION FILED DEC. 13, 1920.
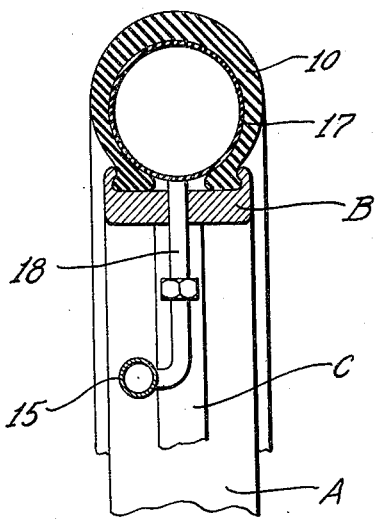
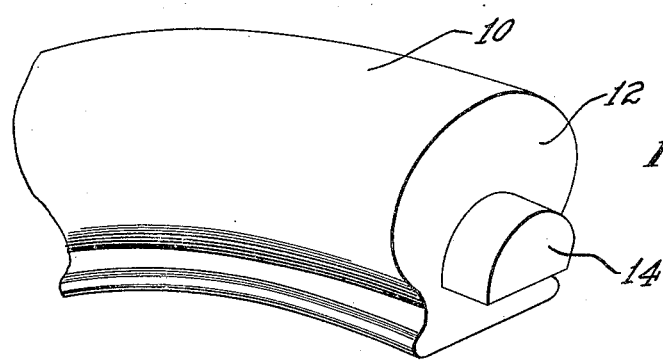
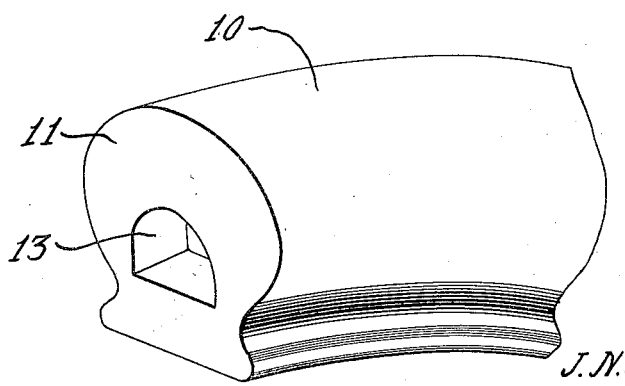

UNITED STATES PATENT OFFICE.

JOHN N. STOUT AND EDWARD E. PARSONAGE, OF STAUNTON, INDIANA.

SECTIONAL PNEUMATIC TIRE.

1,407,178. Specification of Letters Patent. Patented Feb. 21, 1922.

Application filed December 13, 1920. Serial No. 430,309.

*To all whom it may concern:*

Be it known that we, JOHN N. STOUT and EDWARD E. PARSONAGE, both citizens of the United States, residing at Staunton, in the county of Clay and State of Indiana, have invented new and useful Improvements in Sectional Pneumatic Tires, of which the following is a specification.

This invention relates to pneumatic tires and has for its object the provision of a tire which is formed of a plurality of sections detachably connected and normally held in unlocked position by air pressure within the sections, each section containing a separate inflatable tube.

An important object is the provision of a tire of this character in which all the inflatable tubes are connected with a common pressure equalizing tube, automatically operating valves being associate with the equalizing tube whereby the pressure within all the sections will be maintained constant except in the event of puncturing a section in which case the valves will operate as checks to prevent any more air issuing from the punctured section than is originally contained therein.

An advantage of the present invention resides in the fact that in the case of puncturing or blowing out of a section it may be removed and replaced by a perfect section without in any way disturbing the other sections, the tire being as a result less expensive in its upkeep than an ordinary tire.

With the above and other objects and advantages in view, the invention consists in the details of construction to be hereinafter more fully described and claimed and illustrated in the accompanying drawings in which—

Figure 1 is a side elevation of our tire upon a wheel, parts being broken away and in section.

Figure 2 is a cross sectional view.

Figure 3 is an enlarged longitudinal sectional view through one of the equalizing check valves, and Figures 4 and 5 are detail perspective views showing the meeting ends of the sections.

Referring more particularly to the drawings, the letter A designates a wheel having any ordinary or preferred type of rim B carried by spokes C radiating from a hub D.

Our tire is formed of any desired number of casing sections 10 which are disposed upon the rim in the ordinary manner and each of which has its end walls 11 and 12 closed and its side toward the rim open. These sections are formed of rubber and rubberized fabric vulcanized together as in ordinary tire construction. The end 11 of each section is formed with a recess 13 and the end 12 is formed with a corresponding projection 14 so that when all the sections are arranged in circumferential series the projections and recess will have interfitting engagement which will prevent relative displacement of the sections in any direction.

Secured upon one side of the wheel is a tube or pipe 15 of any suitable material and which is provided with an inflation valve 16. Located within each section 10 is an independent inflatable tube 17 with which is connected a stem 18 connected with the tube 15. In this way it will be seen that all inflatable tubes will be in communication so that the pressure will be equalized.

Associated with the tube 15 are valve devices designated broadly by the numeral 19, corresponding in number to the number of sections 10. Each of these valve devices comprises a casing 20 having its ends communicating with the tube 15 and provided internally with a valve seat 21 normally closed by a spring-pressed valve 22.

In the operation of the device it will be seen that as a wheel travels and the weight is borne upon the successive sections 10 the weight upon the lowermost section will of course compress the air therein to a greater degree than the initial pressure. This excess pressure will cause unseating of the associated valve 22 and the successive valves so that the pressure within the tire will be equalized at all points. It will be observed that these valves 22 open only when there is excess pressure within a section and that they thus serve as check valves. This function of the valves is important as in the event of a puncture or blow-out in any one of the sections C, the air within that section may escape, the valves remaining closed and preventing the loss of air within the other sections.

From the foregoing description and a study of the drawings it will be apparent that we have thus provided a simply constructed tire which is sectional and which has its sections removable and replaceable so that in case of a necessary repair only the injured section need be removed. It is of course to be noted that this will reduce the most of tire upkeep as it is quite apparent that the individual sections and tubes therein will naturally be cheaper than an entire tire of ordinary construction.

While we have shown and described the preferred embodiment of our invention, it is of course to be understood that we reserve the right to make such changes in the form, construction, and arrangement of parts as will not depart from the spirit of the invention or the scope of the subjoined claim.

Having thus described our invention, we claim:

In a pneumatic tire comprising a plurality of arcuate tire sections secured in end to end relation and each enclosing an inflatable pneumatic tube, a tubular ring located concentrically of and within and consequently of less diameter than said tire sections and provided with an inflation permitting valves, a plurality of relatively small tubes communicating at one end with said inflatable tubes and communicating at their other ends with said tubular ring, and means for maintaining equal pressure within all of said inflatable tube sections, comprising a series of equalizing valves associated with said tubular ring and located between the successive ones of said last named tubes, each of said equalizing valves comprising a casing secured or formed upon the tubular ring and provided internally with a partition having a hole therethrough, the tubular ring being formed with a partition in alignment with said first named partition and the tubular ring being provided with holes communicating with said casing at opposite sides of said partition therein, and a spring pressed valve located within the casing and normally closing the hole in the partition.

In testimony whereof we affix our signatures.

JOHN N. STOUT.
EDWARD E. PARSONAGE.